C. H. WILLISON.
NUT LOCK.
APPLICATION FILED AUG. 11, 1914.
1,137,042.
Patented Apr. 27, 1915.
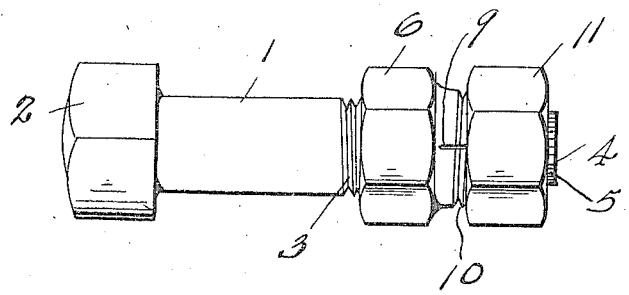
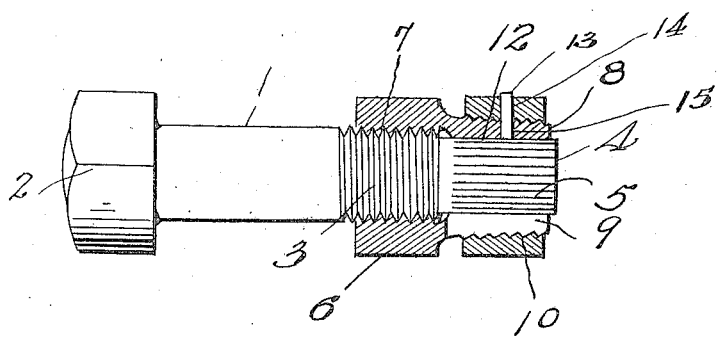
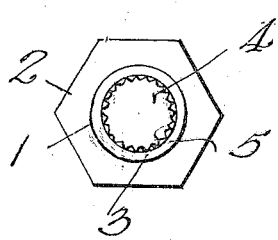
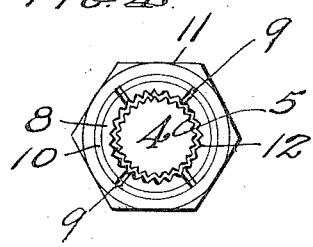
Witnesses.
C. K. Davis
M. L. Newcomb
Inventor
Charles H. Willison
By
Herman A. Phillips
Attorney

UNITED STATES PATENT OFFICE.

CHARLES H. WILLISON, OF ASHLAND, OREGON.

NUT-LOCK.

1,137,042.   Specification of Letters Patent.   Patented Apr. 27, 1915.

Application filed August 11, 1914. Serial No. 856,270.

*To all whom it may concern:*

Be it known that I, CHARLES H. WILLISON, a citizen of the United States of America, residing at Ashland, in the county of Jackson and State of Oregon, have invented certain new and useful Improvements in Nut-Locks, of which the following is a specification.

The present invention relates to improvements in nut locks of the superposed type, and is designed to provide a nut lock which will be economical, efficient and facile in construction and operation.

The invention consists in certain novel combinations and arrangements of parts as set forth in my specification and claim, and as illustrated in the accompanying drawings in which I show an exemplifying structure illustrating the physical embodiment of my invention and constructed according to the best mode I have so far devised for the practical application of the principles of the invention.

Figure 1 is a side elevation of a bolt showing a holding nut and a clamping nut locked thereon. Fig. 2 is a view similar to Fig. 1, but with the two nuts shown in section, the clamping nut locking the holding nut to the bolt end. Fig. 3 is an end view of the bolt. Fig. 4 is an end view of the bolt with the holding nut screwed thereon, and showing the clamping nut in unlocked position free from the holding nut, but in position to be screwed upon the holding nut when clamping it to the bolt.

In the preferred embodiment of my invention, I illustrate a bolt 1 of standard type provided with the usual head 2, and threaded at 3, but the end of the bolt 1 is reduced, and converted to embody the principles of my invention. In converting this standard bolt to preferred construction, the end 4 of the bolt is reduced, and a series of longitudinal extending corrugations or teeth 5 are provided extending from the end of the bolt toward the threads 3. These corrugations or teeth 5 cover the entire surface of the bolt at this point, and are of suitable depth.

The holding nut 6 which is to be threaded upon the threads 3 of the bolt, is interiorly threaded at 7 complementary to the threads 3, and a sleeve 8 is formed integral with the holding nut 6. This sleeve 8 is provided with four slots 9 which extend from the end of the sleeve to near the body of the nut, and render the sleeve resilient. The outer periphery of the sleeve is threaded as at 10, and upon these threads 10 the clamping nut 11, which is also threaded and tapered, is adapted to be turned. The interior of the sleeve 8 is also threaded or corrugated as at 12. These corrugations extend longitudinally of the sleeve, and are adapted to fit into the teeth or corrugations 5 on the bolt end.

In assembling the parts, the bolt is locked in proper position, and the holding nut is secured tight thereon, the corrugations 12 and 5 being free of each other. To lock the nut in position, the clamping nut 11 is now turned upon the threaded sleeve 8, and as the clamping nut turns upon the sleeve, the sleeve is gradually compressed so that the teeth or corrugations 12 engage the corrugations 5, and when the clamping nut is turned home the engagement of these two sets of teeth effectively prevent the turning of the holding nut, as shown in Fig. 2. If necessary, I employ a bolt or pin 13 which is passed through alined perforations 14 and 15 in the nut 11 and sleeve 8, respectively, to securely hold the nut and sleeve in position on the bolt.

From the above description taken in connection with my drawings it is evident that I have provided a novel means for clamping the holding nut on its bolt against rotation, and this may be accomplished with facility and despatch, and when the nut is locked on the bolt the possibility of its turning is eliminated.

Having thus described my invention, what I claim as new and desire to secure by Letters Patent, is:

The combination with a threaded bolt and holding nut having a resilient tapered sleeve with external threads, and a clamping nut engaging the external threads, corrugations on the exterior of the bolt end, and corrugations on the interior of the sleeve adapted to engage the corrugated bolt.

In testimony whereof I affix my signature in presence of two witnesses.

CHARLES H. WILLISON.

Witnesses:
 NATHAN S. KOHN,
 G. H. BILLINGS.